Feb. 24, 1931. H. FORD 1,793,921
BRAKE
Filed Oct. 5, 1927
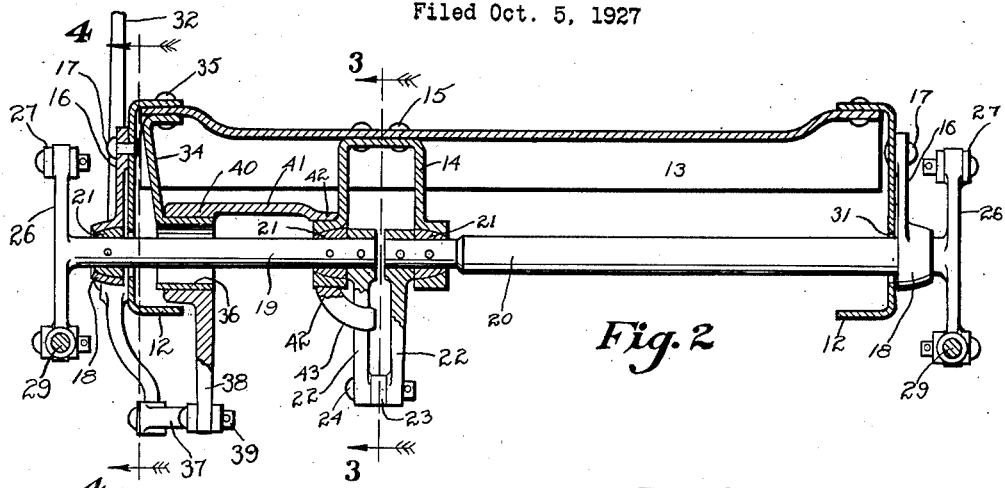
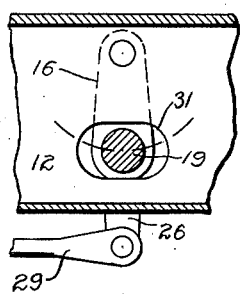
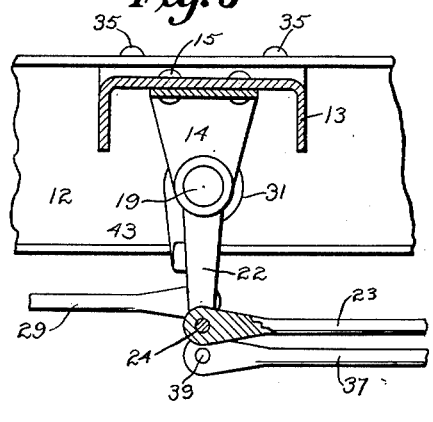
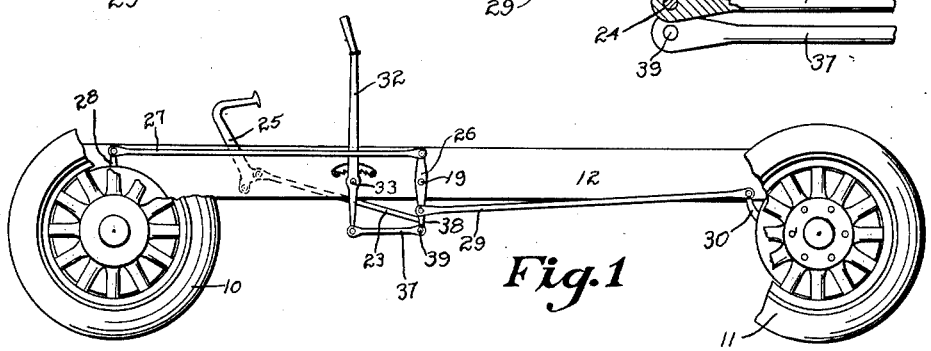
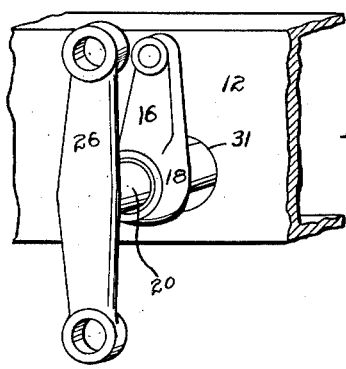
INVENTOR.
Henry Ford.
BY G. R. Halbert.
E. H. Davis
ATTORNEYS.

Patented Feb. 24, 1931

1,793,921

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

BRAKE

Application filed October 5, 1927. Serial No. 224,093.

The object of my invention is to provide a brake of simple, durable and inexpensive construction.

Still a further object of my invention is to provide a brake adapted for use with all four wheels of an automobile wherein means are provided for equalizing the pressure applied by the brake operating members so that uniform operation on all four brakes will be insured.

Still a further object of my invention is to provide means for equalizing the pressure applied to the front and rear wheel on each side, and to provide in connection with such an equalizing device, means for insuring that an equal pressure will be applied to the two brakes at each side of the vehicle.

Still a further object of my invention is to provide a brake equalizing device wherein the rock-shaft mounted on the frame is made from two separate and independent aligned shafts and the outer ends of said shafts may be mounted to swing in a substantially horizontal plane to equalize the pressure applied respectively to the front and rear wheel brakes connected to said ends.

Still a further object of my invention is to provide a pair of aligned rock shafts mounted on the frame for operating the brakes, the outer ends of these shafts being mounted to swing from front to rear to equalize the pressure applied thereby, the diameter of the shafts being varied in proportion to the distance from the pedal connection to the brake connections for each shaft, whereby the two ends of said shafts will each twist the same amount relative to a given pedal movement even though said outer ends are unequal distances from the pedal connection at the inner end of said shafts.

With these and other objects in view my invention consists in the arrangement, construction, and combination of the various parts of my improved device, as described in the specification claimed in the claims, and illustrated in the accompanying drawings in which:

Figure 1 shows a side elevation of an automobile chassis, parts being broken away to better illustrate the construction.

Figure 2 shows a vertical transverse sectional view through said chassis, taken on the axis of the rock shafts which operate the brakes.

Figure 3 shows a longitudinal vertical sectional view taken on the line 3—3 of Figure 2.

Figure 4 shows a similar view taken on the line 4—4 of Figure 2, and

Figure 5 shows a prospective view illustrating the construction at the outer end of the brake operating rod shaft whereby equalizing of the brakes from front to rear at each side is insured.

Referring to the accompanying drawings I have used the reference numeral 10 to indicate the front wheels of an automotive vehicle and the reference numeral 11 to indicate the rear wheels thereof.

A frame has side members 12 and the central transverse member 13. This member 13 is of channel cross section.

A U shaped bracket member 14 is secured by the rivets 15 to the under side of the frame member 13 in position intermediate of the ends thereof, but somewhat nearer to one end than to the other. Spherical bearing seats are formed in the lower end of each of the arms of the bracket 15. Rock shaft supporting arms 16 are pivotally mounted at 17 on the side frame members opposite the ends of the frame cross member 13. Spherical bearing seats 18 are formed in the lower ends of the arms 16 and these arms are pivoted to the frame in such a position that when the arms are vertical, then the spherical seats 18 will line up with the spherical seats in the ends of the bracket 15.

Rock shafts 19 and 20 are provided with spherical sleeves 21 adjacent to each end which are designed to be received in the spherical seats in the arms 16 and the bracket 15 whereby the inner ends of these shafts may be mounted for rotation only and the outer ends may be mounted for both rotation and swinging movement on the arms 16.

Parallel arms 22 are fixed to the inner ends of the shaft 19 and 20 respectively, and extend downwardly therefrom. A link 23 is disposed between the lower ends of the arms 22 and pivotally connected thereto by a pin 24. This pin 24 is loosely received in the arms 22 and the link 23 so that swinging of the shafts 19 and 20 in the spherical bearings will not cause binding or other interference with the rotation of these shafts by the reciprocation of the link 23. The forward end of the link 23 is pivotally connected to the brake pedal 25 which is pivotally mounted on the vehicle in any of the many well known ways in which said foot pedals are mounted. The outer ends of the shafts 19 and 20 each have vertical brake operating arms 26 which extend in a vertical plane in both directions from the said shafts at their outer ends. These arms 26 may be formed integral with the shafts 19 and 20 or separately therefrom, and secured thereto, as may be desired. A brake operating link 27 extends from the upper end of the arm 26 to a front wheel brake operating lever 28 at the forward end of the vehicle. The lower ends of the arms 26 are connected by links 29 with a rear wheel brake operating lever 30.

The construction of the parts described is such that rotation of the rockshafts 19 and 20 caused by the swinging of the foot pedal 25 and reciprocation of the link 23 will swing arms 26 to thereby pull the links 27 and 29 to operate the front and rear brake operating levers 28 and 30.

It is well known that a relatively small movement might tighten the front wheel brakes and a considerable movement might be required to tighten the rear wheel brakes, or the movement required to operate the brakes might be reversed. For instance, it might require a half inch movement of the upper end of the arm 26 to tighten the front wheel brake whereas it might require an inch movement of the lower end of the arm to tighten a rear wheel brake. In such a case the rotation of the shaft 19 would first engage the front wheel brake until the effort required therefor commenced to build up, at which time the resistance would pull the arm 16 forwardly and consequently the shaft 19 until the lower end of the arm 26 applied the same pressure both to the link 29 and the link 27. In other words, the shafts 19 and 20 will swing at their outer ends on the arms 16 to equalize the pressure applied thereby to the front and rear wheel brake operating links.

A slot 31 is provided in the side frame member 12 to permit the necessary swinging of the outer end of the shaft 19 and 20.

In case it is desired to use these brakes for the emergency equipment for the vehicle, means may be provided for connecting the rock shafts 19 and 20 with emergency brake lever 32. Such a connection should of course include means whereby the brakes will be operated when the emergency lever is operated, but such that the emergency lever will not be moved when the brake pedal is moved to operate the brakes. One form of such a device is herein illustrated wherein the emergency brake 32 is pivoted at 33 to the frame member 12, and extends down below said frame member. A bracket 34 is riveted as at 35 to the adjacent end of the transverse frame member 13 and the lower end of this bracket is provided with a bearing sleeve 36 concentric with the axis of the shafts 19 and 20, the opening in said sleeve 36 being large enough to permit the necessary swinging of the outer end of the shaft 19.

A forging is formed which is designed to be journaled on the exterior of the sleeve 36 and the exterior of the spherical seat of the left hand arm of the bracket 15, and to have one arm which will engage one of the arms 22, and the other arm to be pivotally connected to a link 37 which is pivotally connected to the lower end of the emergency brake lever 32. This forging has the downwardly extending arm 38 which is connected by the pivot pin 39 to the link 37, and a bearing sleeve 40 is formed integral with said member at the upper end of the arm 38, this sleeve being designed to rotate on the exterior of the bearing sleeve 36. A member 41 is formed integral with the sleeve 40 and extends laterally along the upper part of the shaft 19 to position adjacent to the spherical seat on the bracket 15 where a sleeve 42 is formed which is designed to be rotatably mounted on the exterior of said spherical seat. An arm 43 is formed integral with sleeve 42 and extends downwardly and laterally to position behind the adjacent arm 22. This arm 43 is so shaped and the remaining parts are so arranged that the arm 43 will just clear the arm 22 when the parts are all in their retracted or inoperative position. Whenever the foot pedal is pressed to operate the brakes, the arm 22 will merely move further away from the arm 43. When however, it is designed to set the brakes with the emergency lever 32, then said lever is swung on its pivot which will swing the arm 43 into engagement with the arm 22 thereby swinging the rockshafts 19 and 20 to operate the brakes. It will thus be seen that movement of the brake by the foot pedal does not affect the position of the emergency lever, but that movement of the emergency lever will operate all four of the brake members.

It will be noted that the shaft 20 is of greater diameter than the shaft 19. By means of this novel construction I am enabled to rotate the arms 26 exactly the same amount even though the length of the shafts 19 and 20 are not the same, so that they would have a tendency to twist different amounts between their actuating connection and the arms 26. By this difference in the diameter of the shafts the twist of the shafts between the arms 22 and the arms 26 will be exactly the same even though the distances are different, and equal operation of the brakes on both sides of the vehicle will be insured.

Among the many advantages derived from the use of my improved device, it should first be pointed out that it provides a very simple means for equalizing the front and rear brakes. Still a further advantage results from the fact that this equalizing is accomplished by the use of two rockshafts which, however, are aligned with each other so that they take up no more room and very little more bearing members than would be used if only an ordinary rockshaft were used. In other words by this construction I am enabled to efficiently use four wheel brakes with substantially the same operating parts as were formerly used in connection with the operation of two wheel brakes, and still equalizing of the brakes from front to rear is insured.

Still a further advantage of this construction results from the fact that the emergency lever may be operated to operate the brakes which are operated by the foot pedal, but very little additional equipment is needed therefor and the construction of such equipment is very simple and not at all likely to get out of order.

Some changes may be made in the construction, combination and arrangement of the various parts of my improved device without departing from the spirit of my invention, and it is my intention to cover by my claims such changes as may reasonably be included within the scope thereof.

I claim as my invention:

1. In a device of the character described, a pair of spaced frame members, a pair of axially aligned shafts extending between said frame members, brake operating arms at the outer ends of said shaft, means for supporting said outer ends to permit rotary and horizontal movement thereof, means for simultaneously actuating the inner ends of said shaft, an emergency brake operating member rotatably mounted on said frame in substantial alignment with the aligned shafts, an axial opening in said operating member through which one of the aligned shafts extends, said opening being of a sufficient size to permit longitudinal movement of the outer end of said aligned shaft, and means extending from the inner end of said operating member co-acting with the inner ends of said aligned shafts so that rotation of the operating member will rotate said shafts.

2. In a device of the character described, a pair of spaced frame members, brake operating means extending between said frame members, means for supporting the outer ends of said operating means to permit rotary and horizontal movement thereof, an arm extending from the intermediate portion of said operating means adapted to be connected to a brake pedal, an emergency brake operating means axially aligned with the first mentioned operating means having an opening therein through which said operating means extends, said opening being of sufficient size so that horizontal movement of the operating means will be permitted, and means formed on the emergency brake operating means co-acting with said arm so that rotation of the last mentioned means will rotate the brake operating means.

3. In a device of the character described, a pair of spaced frame members, a pair of axially aligned shafts extending between said frame members having their inner ends mounted for swivelling movement and their outer ends mounted for longitudinal and rotary movement, an emergency brake operating means rotatably mounted in said frame having an axial opening therein through which one of said shafts extends, and means for operating the inner ends of said shafts by the operating means, said opening being of a size permitting longitudinal movement of the operating means to equalize the brake action.

4. In a device of the character described, a service brake operating means, an emergency brake operating means normally in axial alignment therewith having an opening therein through which the service brake operating means extends, means for rotatably mounting the emergency brake operating means, and means for actuating the service brake operating means from the emergency brake operating means, said opening being of a size sufficient to permit longitudinal movement of the service brake operating means to equalize the brake action.

HENRY FORD.